United States Patent
Shim

(10) Patent No.: US 9,006,682 B2
(45) Date of Patent: Apr. 14, 2015

(54) MICROBICIDAL PURIFICATION DEVICE EMPLOYING ULTRAVIOLET LIGHT FROM WHICH ULTRAVIOLET-LIGHT-IRRADIATION DEAD AREAS HAVE BEEN ELIMINATED

(76) Inventor: Jong Seop Shim, Gwangju-si (KR)

( * ) Notice: Subject to any disclaimer, the term of this patent is extended or adjusted under 35 U.S.C. 154(b) by 0 days.

(21) Appl. No.: 13/503,537

(22) PCT Filed: Oct. 22, 2009

(86) PCT No.: PCT/KR2009/006110
§ 371 (c)(1),
(2), (4) Date: Apr. 23, 2012

(87) PCT Pub. No.: WO2011/049252
PCT Pub. Date: Apr. 28, 2011

(65) Prior Publication Data
US 2012/0205552 A1    Aug. 16, 2012

(51) Int. Cl.
*C02F 1/32*      (2006.01)

(52) U.S. Cl.
CPC ......... *C02F 1/325* (2013.01); *C02F 2201/3227* (2013.01); *C02F 2303/04* (2013.01)

(58) Field of Classification Search
CPC ..... C02F 1/32; A61L 2/10; G21K 5/00–5/10; B01J 19/123
USPC ........................................ 250/435; 422/186.3
See application file for complete search history.

(56) References Cited

U.S. PATENT DOCUMENTS

| | | | | |
|---|---|---|---|---|
| 4,179,616 A | * | 12/1979 | Coviello et al. ............ | 422/186.3 |
| 5,290,439 A | * | 3/1994 | Buchwald .................. | 210/198.1 |
| 6,402,964 B1 | * | 6/2002 | Schmid ...................... | 210/198.1 |
| 6,570,173 B1 | * | 5/2003 | Kunkel et al. ............. | 250/504 R |
| 7,141,222 B2 | * | 11/2006 | Wong ......................... | 422/186.3 |
| 7,230,255 B2 | * | 6/2007 | Shim ......................... | 250/453.11 |
| 7,662,293 B2 | | 2/2010 | Brolin et al. | |
| 2006/0124860 A1 | * | 6/2006 | Shim ......................... | 250/432 R |
| 2007/0003430 A1 | * | 1/2007 | Kaiser et al. .................... | 422/24 |
| 2008/0179178 A1 | * | 7/2008 | Cabello et al. ........... | 204/157.44 |
| 2012/0097862 A1 | * | 4/2012 | Snowball ....................... | 250/437 |

FOREIGN PATENT DOCUMENTS

| | | |
|---|---|---|
| JP | 01-097459 | 4/1989 |
| JP | 09-085047 | 3/1997 |
| JP | 11-077031 | 3/1999 |

(Continued)

OTHER PUBLICATIONS

International Search Report for PCT/KR2009/006110 Mailed on Jul. 21, 2010.

*Primary Examiner* — Nicole Ippolito
*Assistant Examiner* — James Choi
(74) *Attorney, Agent, or Firm* — Revolution IP, PLLC

(57) ABSTRACT

A microbicidal purification device eliminating dead areas where ultraviolet light does not reach and sterilization does not take place, the device includes a first header and a second header, each header has a header space, the first header has an inlet port and a plurality of tubes, and the second header having an outlet port; a plurality of tubes which are cylindrical tube assemblies both ends of each of which are open and are arranged in parallel with the plurality of tubes of the first header so that the opening of each of the both ends can be connected with the header space of the first header and the header space of the second header in parallel where a plurality of ultraviolet lamp is inserted into each of the plurality of tubes.

4 Claims, 5 Drawing Sheets

(56) References Cited

FOREIGN PATENT DOCUMENTS

| JP | 11-290844 | 10/1999 |
| JP | 2006-502861 | 1/2008 |
| KR | 10-2003-0075063 | 9/2003 |
| KR | 10-2009-0122085 | 11/2009 |

* cited by examiner

MICROBICIDAL PURIFICATION DEVICE EMPLOYING ULTRAVIOLET LIGHT FROM WHICH ULTRAVIOLET-LIGHT-IRRADIATION DEAD AREAS HAVE BEEN ELIMINATED

RELATED APPLICATIONS

This application is a 371 application of International Application No. PCT/KR2009/006110, filed Oct. 22, 2009, which is incorporated herein by reference in its entirety.

TECHNICAL FIELD

The present invention relates to a microbicidal purification device employing ultraviolet light from which ultraviolet-light-irradiation dead areas have been eliminated, and in particular to a microbicidal purification device employing ultraviolet light from which ultraviolet-light-irradiation dead areas have been eliminated, which device does not have an ultraviolet-light-irradiation dead area where microbicidal purification is not performed as ultraviolet light does not reach, in such a manner that crystal tubes with an ultraviolet light lamp inserted therein are positioned in a plurality of cylindrical tubes connected to a header.

BACKGROUND ART

The use of water continues to sharply increases as industrial society and life standard advance, as a result of which sewage and wastewater are produced a lot, so the demand on sewage and wastewater disinfection and purification facility increases, and the expansion of purification facility for supplying drinkable water is demanded a lot.

An ordinary water treatment technology is formed of a biological treatment technology using microorganism and a physical and chemical treatment technology such as a filtration, a coagulation, a precipitation or an adsorption; however the construction of the biological treatment technology costs a lot, and it is hard to eliminate a non-biodegradable contamination substance, and the operation of a physical and chemical treatment technology costs a lot as well while producing a lot of sludge.

Chlorine disinfection generally used in an ordinary water treatment plant produces, during treatments, a THM (Trihalomethanes) substance which is harmful to a human body, and it is disadvantageously hard to eliminate chlorine organic compounds which are discharged from a variety of industry sites.

For the above reasons, an ultraviolet light sterilization which is directed to sterilize bacteria and harmful microorganism without producing a secondary contamination receives attention. The ultraviolet light sterilization is directed to performing sterilization by destroying the DNA of microorganism by scanning an ultraviolet light of a wavelength of 253.7 nm to microorganism or inhibiting proliferation operation.

The photocatalyst sterilization method recently receives attention, which method is directed to efficiently eliminating non-biodegradable organic compounds contained in water by treating the wastewater which is hard to treat by a standard active sludge method in such a way to combine and use semiconductor metallic compounds such as ultraviolet light and $TiO^2$. Here, the photocatalyst is directed to a substance which has a catalyst reaction by means of light such as ultraviolet light (UV), thus effectively eliminating contamination substances by oxidizing and degrading various contamination substances which come into contact with. The photocatalyst makes it possible to prevent a secondary contamination in such a way to fully oxidize and degrade the contamination substances while treating contamination substances in their liquid and gaseous phases. It can treat at a room temperature and a normal pressure as well as at a low temperature, and is excellently advantageous in eliminating BOD (Biochemical Oxygen Demand), COD (Chemical Oxygen Demand), chromaticity, SS (Settable Solids) and a small elimination function. In addition, its application currently spreads over a variety of industrial fields and actual life such as in the fields of heavy metal elimination, non-biodegradable organic substance elimination, and sterilizations of various microorganisms.

The ultraviolet light sterilization method has a short effective range in terms of ultraviolet light, so a high power ultraviolet light lamp or a plurality of ultraviolet light lamps are needed for the purpose of treating a proper amount of work. FIG. 4 is a view illustrating a ultraviolet light sterilization device with a plurality of ultraviolet light lamps. As shown in FIG. 4, the ordinary ultraviolet light sterilization device comprises a housing 1 with an inlet port 1a and an outlet port 1b at its both sides for passing fluid such as air or water into the interior, and crystal tubes 2 spaced at regular intervals in the interior of the housing 1, the ultraviolet ray lamp 3 being inserted in the interior of the crystal tube. In FIG. 4, reference numeral 4 represents a photocatalyst coating carrier filled around the crystal tubes 2.

The ultraviolet light sterilization device is characterized in that the crystal tubes 2 with the ultraviolet light lamp 3 being inserted into the same are arranged at regular intervals in the interior of the housing 1 for the purpose of ensuring that ultraviolet light can uniformly scan from the ultraviolet light lamp 3. For example, as shown in FIG. 5, in case that the cross section of the housing 1' is circular, the crystal tubes 2' are arranged at the regular intervals on the concentric circle around the center and at it surrounding. As shown in FIG. 6, when the cross section of the housing 1" is rectangular, the crystal tubes 2" arranged at regular intervals. Here, the regions S1 and S2 (hereinafter referred to "sterilization regions") where are sterilized as the ultraviolet rays reach from the ultraviolet light lamp inserted in the crystal tubes 2' and 2" for effective sterilizations are formed in a circular shape about each crystal tube 2', 2". As shown in FIGS. 5 and 6, the crystal tubes 2' and 2" are so arranged that the sterilization regions S1 and S2 do not overlapped with each other. In case that the crystal tubes 2' and 2" are arranged so that the sterilization regions S1 and S2 do not overlap with each other, the regions where the sterilization regions S1 and S2 do not overlap with each other are formed, in other words, the ultraviolet light scanning dead regions D1 and D2 are formed, so the fluid passing through the ultraviolet light scanning dead regions D1 and D2 is not fully sterilized. The above problems might be resolved by overlapping the sterilization regions S1 and S2, but the unnecessary sterilization is conducted at the portions where the sterilization regions S1 and S2 are overlapped, after the sterilization is fully performed, thus consuming more energy. In case that the crystal tubes 2' and 2" are arranged so that the sterilization regions S1 and S2 are overlapped, a lot of crystal tubes 2' and 2" are required, so the number of assembling processes increases, so the manufacture costs a lot. In case that photocatalyst is used together with ultraviolet light, it is hard to adjust the amount of ultraviolet light scanned to the photocatalyst coating carrier.

DISCLOSURE OF INVENTION

Accordingly, the present invention is made depending on the above problems, and it is an object of the present invention to provide a microbicidal purification device employing ultraviolet light from which ultraviolet-light-irradiation dead areas have been eliminated, which is characterized in that it is possible to eliminate the ultraviolet light scanning dead regions where the sterilization is not conducted since ultraviolet does not reach, in such a way that crystal tubes with an ultraviolet light lamp inserted therein are positioned in a plurality of cylindrical tubes connected to a header.

To achieve the above objects, there is provided a microbicidal purification device employing ultraviolet light from which ultraviolet-light-irradiation dead areas have been eliminated which comprises a pair of headers which each have a header space and inlet and outlet ports connected to the space of the header; a plurality of tubes which are cylindrical tube assemblies both ends of each of which are open and are arranged in parallel so that the opening of each of the both ends can be connected with each header space; a crystal tube which is a tube element one end of which is closed, and the other end is sealingly fixed at the header of one side so that the other open end can be exposed to the outside of the header of one side among the headers, the crystal tube being inserted in the tube and being positioned at the center of the tube; and an ultraviolet light lamp which has a ultraviolet light output forming the diameter of a sterilization region to be larger than or same as the diameter of the tube and inserted and installed in the interior of the crystal tube.

In addition, the microbicidal purification device employing ultraviolet light from which ultraviolet-light-irradiation dead areas have been eliminated, according to the present invention further comprises a photocatalyst coating carrier which is coated with a photocatalyst and is filled in the interior of the tube, a blocking net having a mesh smaller than the size of the photocatalyst coating carrier being installed at the openings of both ends of the tube assembly for the purpose of ensuring that the photocatalyst coating carrier does not escape to the outside as a through hole is formed at the center for allowing the crystal tube to insert and pass through.

In addition, the microbicidal purification device employing ultraviolet light from which ultraviolet-light-irradiation dead areas have been eliminated, according to the present invention further comprises a cover which is disposed at a header of one side where the crystal tube is fixed, thus covering the other end of the crystal tube and the lamp inserted into the crystal tube.

ADVANTAGEOUS EFFECTS

The microbicidal purification device employing ultraviolet light from which ultraviolet-light-irradiation dead areas have been eliminated according to the present invention, which is characterized in that it is possible to eliminate the ultraviolet light scanning dead regions where the sterilization is not conducted since ultraviolet does not reach, in such a way that crystal tubes with an ultraviolet light lamp inserted therein are positioned in a plurality of cylindrical tubes connected to a header.

BRIEF DESCRIPTIONS OF KEY ELEMENTS OF THE DRAWINGS

Figure 1:
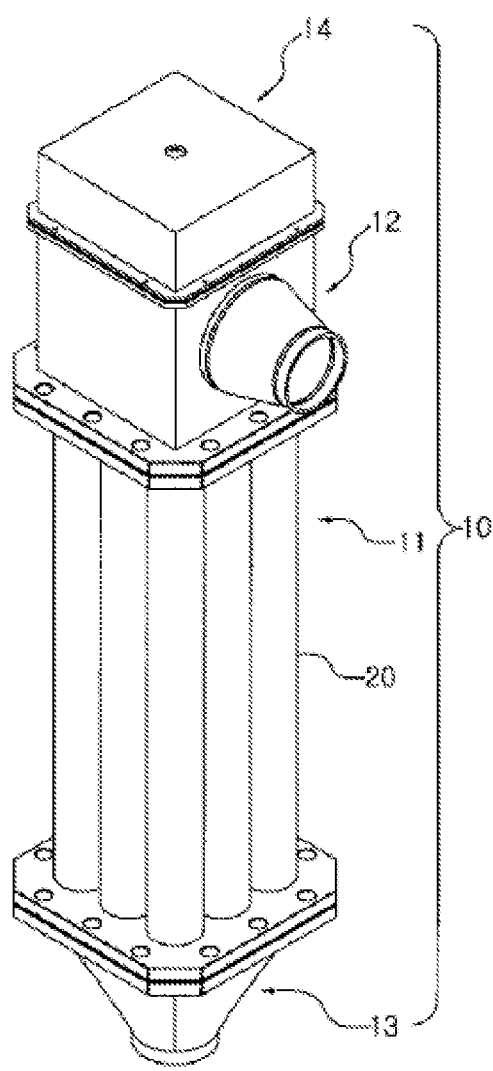
FIG. 1 is a perspective view illustrating a microbicidal purification device employing ultraviolet light from which ultraviolet-light-irradiation dead areas have been eliminated, according to an embodiment of the present invention.

10: tube assembly
11: body
12, 13: header
121, 131: inlet and outlet ports
14: cover
20: tube
21: blocking net
30: crystal tubes
40: ultraviolet light lamp
50: photocatalyst coating carrier

MODES FOR CARRYING OUT THE INVENTION

The microbicidal purification device employing ultraviolet light from which ultraviolet-light-irradiation dead areas have been eliminated, according to the present invention will be described with reference to the embodiments shown in the drawings.

Figure 2:
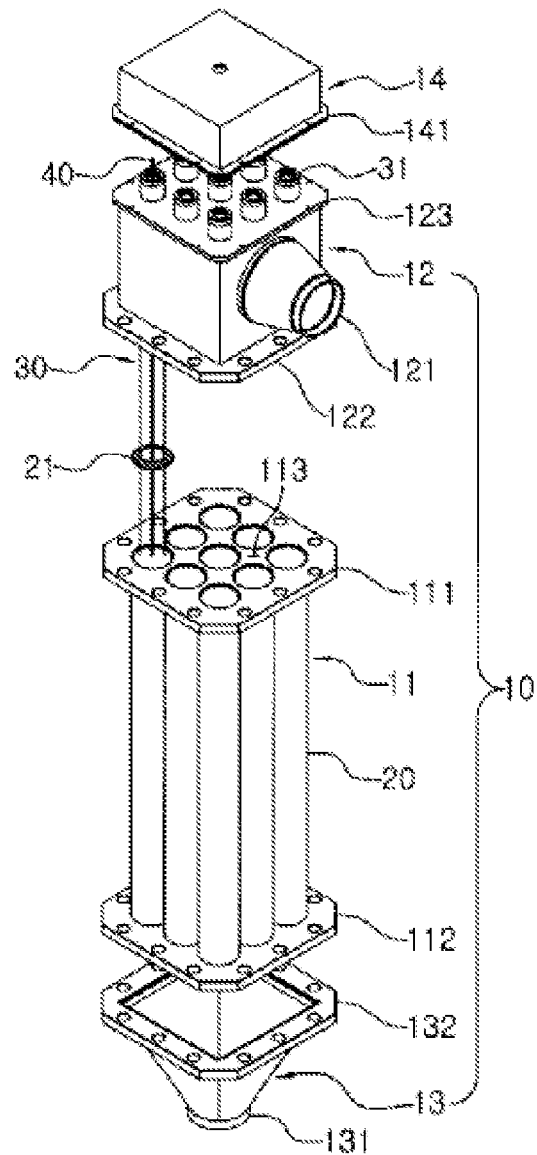
FIG. 2 is a disassembled perspective view illustrating a microbicidal purification device employing ultraviolet light from which ultraviolet-light-irradiation dead areas have been eliminated, according to an embodiment of the present invention.
Figure 3:
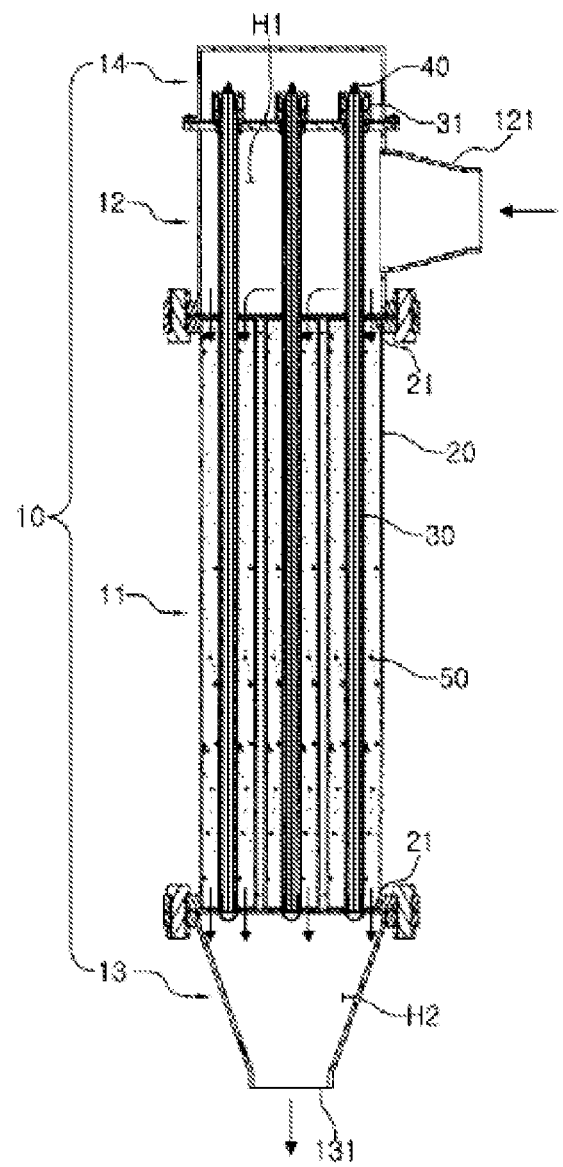
FIG. 3 is a cross sectional view illustrating a microbicidal purification device employing ultraviolet light from which ultraviolet-light-irradiation dead areas have been eliminated, according to an embodiment of the present invention.
Figure 4:
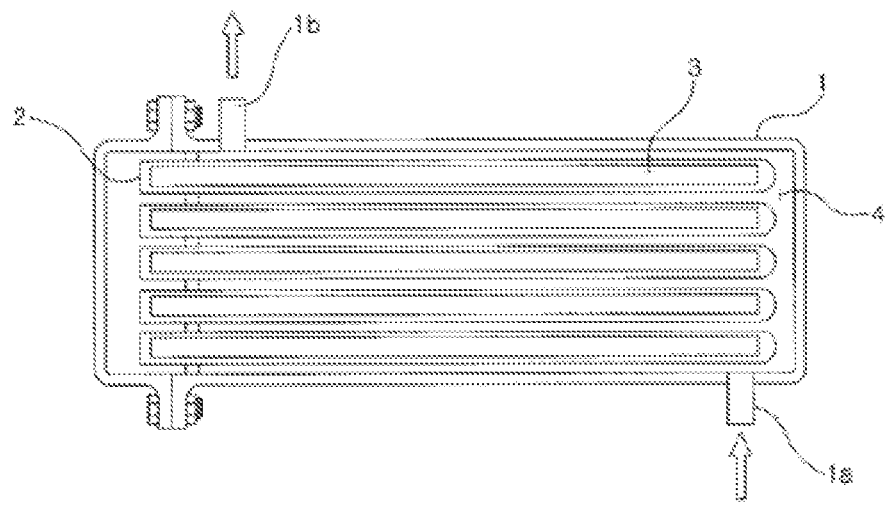
FIG. 4 is a cross sectional view illustrating a conventional ultraviolet light sterilization apparatus.
Figure 5:
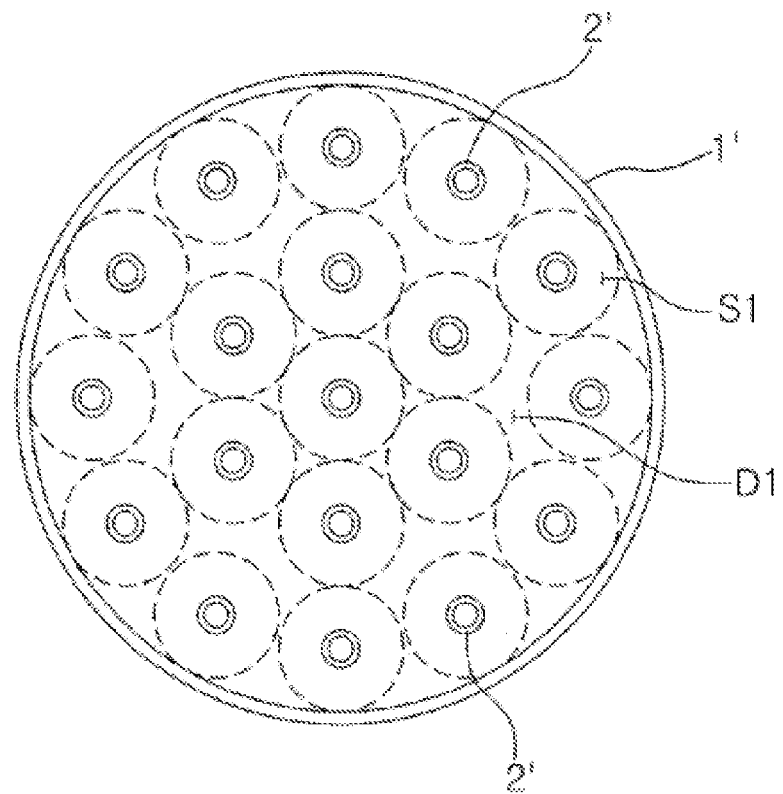
FIGS. 5 and 6 are cross sectional views illustrating a concept arrangement of crystal tubes of a conventional ultraviolet light sterilization apparatus.
Figure 6:
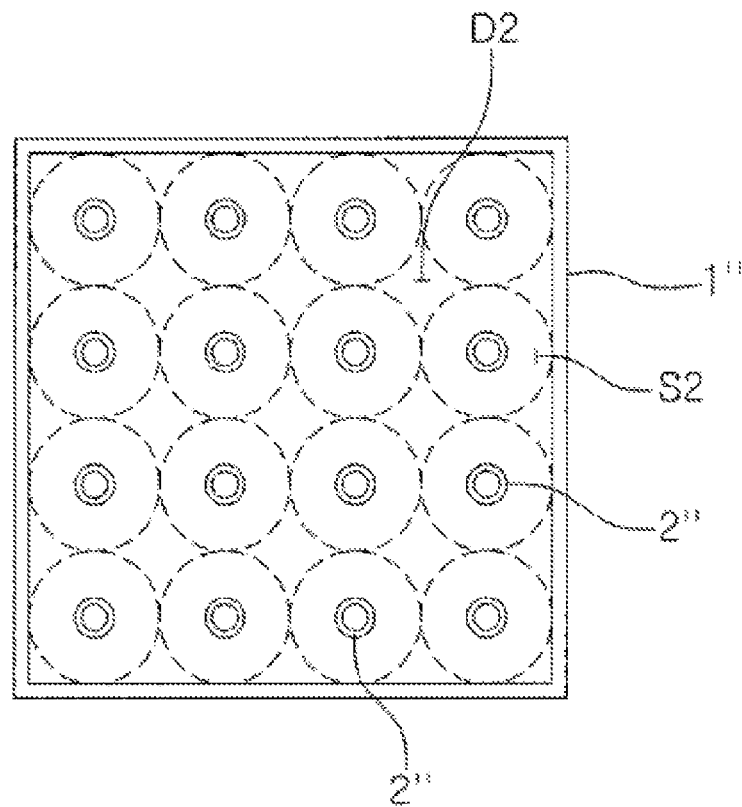

FIG. 1 is a perspective view illustrating a microbicidal purification device employing ultraviolet light from which ultraviolet-light-irradiation dead areas have been eliminated, according to an embodiment of the present invention. FIG. 2 is a disassembled perspective view illustrating a microbicidal purification device employing ultraviolet light from which ultraviolet-light-irradiation dead areas have been eliminated, according to an embodiment of the present invention. FIG. 3 is a cross sectional view illustrating a microbicidal purification device employing ultraviolet light from which ultraviolet-light-irradiation dead areas have been eliminated, according to an embodiment of the present invention.

The microbicidal purification device employing ultraviolet light from which ultraviolet-light-irradiation dead areas have been eliminated, according to an embodiment of the present invention comprises a tube assembly 10 formed of a body 11 and headers 12 and 13, a tube 20, a crystal tube 30, an ultraviolet light lamp 40 and a photocatalyst coating carrier 50.

The tube assembly 10 comprises a body 11 in which a plurality of tubes 20 are arranged in parallel and are integrally engaged, headers 12 and 13 for inputting fluid such as air or water which needs sterilization into the tube 20 and for forming a passage and a space for discharging the fluid which passes through the tube 20, and a cover 14.

The body 11 is configured in such a way that the tubes 20 are arranged and integrally engaged. In the drawings, nine tubes 20 are closely arranged with one another for the crystal tubes 30 to be inserted and installed in the interior. The tubes 20 of the body 11 are configured with its both ends to be integrally engaged with each other by means of the flanges 112 and 112. The flange 112, 112 coupling both ends of the tube 20 is engaged with each flange 122, 123 provided at the header 12, 13. At an opening of each of the both ends of the tube 20 of the body 11 is installed a partition 113 for blocking the surrounding portions of the opening of the tube 20.

The headers 12 and 13 are provided to form the header spaces H1 and H2 at both sides of the body 11 for the fluid to input into the interior of the tube 20 integrally engaged with the body 11 and at the same time for the fluid to be discharged. As show in the drawings, one side of each of the headers 12 and 13 is open, and the other side is formed in a sealed container shape, and the flanges 122 and 132 to be engage to the flanges 111 and 112 of the body 11 are provided at the opened side and are connected at both sides of the body 11. The inlet and outlet ports 121 and 131 connected with the header spaces H1 and H2 are formed at the headers 12 and 13. Fluid is inputted via one of the inlet and outlet ports 121 and 131 and is discharges via the other one. For example, the fluid is inputted into the header space H1 formed by the header 12 of the side of the inlet port via the inlet port 121 and then is inputted into the opening of one side of the tube 20 connected with the header space H1 and is collected in the header space H2 formed by the header 13 of the side of the outlet port via the opening of the other side and then is discharged via the outlet port 131. One end of the crystal tube 30 inserted in the interior of the tube 20 is sealingly fixed at the header 12 of the inlet port.

The cover 14 is engaged to one end of the crystal tube 30 fixed at the header 12 of the side of the inlet port and the header 12 of the side of the inlet port for thereby covering the ultraviolet light lamp 40 inserted in the crystal tube 30. The cover 14 is formed of a flange 141 at an entrance formed in a container shape for an engagement at the flange 123 which is disposed at the header 12 of the side of the inlet port.

The tube 20 serves to limit the space used for fluid to flow so that the fluid can flow within a sterilization region of the surroundings of the crystal tube 20. As shown in the drawings, the tube 20 is a cylindrical tube both ends of which are open and is arranged in the interior of the body 11 so that each opening of both ends is connected with each of the header spaces H1 and H2. A partition 113 is installed at each entrance of both ends of the body 11 for thereby blocking the surrounding portions of the opening of the tube 20 in a state that the tube 20 is arranged in the above manner, as a result of which the fluid discharged into the header spacers H1 and H2 flows only into the interior of the tube 20. The crystal tube 30 is inserted into the interior of the tube 20 and is positioned at the center. When the photocatalyst coating carrier 50 is filled in the interior of the tube 20 so that sterilization is promoted by ultraviolet light, a blocking net 21 having a mesh smaller than the size of the photocatalyst coating carrier 50 is installed at each opening of both sides of the tube 20 so that the photocatalyst coating carrier 50 does not escape to the outside. At the center of the blocking net 21 is formed a through hole 211 allowing the crystal tube 30 is inserted and passes.

The crystal tube 30 serves to prevent the fluid flowing in the interior of the tube 20 to come into contact with the ultraviolet light lamp 40, with one end of the crystal tube 30 being blocked. The crystal tube 30 is configured in such a way that the other end is sealingly fixed at the header 12 of the side of the inlet port so that the open other end is exposed to the outside of the header 12 of the side of the inlet port among the headers 12 and 13 and is inserted into the tube 20 so that the one end is positioned at the center of the tube 20.

The ultraviolet light lamp 40 emits ultraviolet light so as to sterilize microorganism and bacteria contained in the fluid and is inserted and installed in the interior of the crystal tube 30.

The photocatalyst coating carrier 50 is provided to accelerate the sterilization by means of ultraviolet light and is filled in the interior of the tube 20. Since the photocatalyst coating carrier 50 is the same as the conventional photo catalyst coating carrier, the detailed description thereof will be omitted.

The present invention is characterized in that the sterilization can be fully conducted as the flow of the fluid via the ultraviolet light scanning dead regions is eliminated by means of the tube 20 in such a way that the flow of the fluid is forced to flow via the interior of the sterilization regions where sterilization is actually conducted.

The microbicidal purification device employing ultraviolet light from which ultraviolet-light-irradiation dead areas have been eliminated, which has been described in the above and has been shown in the drawings, is provided only for the purpose of one embodiment of the present invention, and is not assumed to be interpreted as one limiting the technical concepts of the present invention. The protection scopes of the present invention are determined only by the contents recited in the claims below, and it is obvious to an ordinary person in the art that the improvements and modifications not escaping from the gist of the present invention belong to the protection scope of the present invention.

INDUSTRIAL APPLICABILITY

The present invention provides a microbicidal purification device employing ultraviolet light from which ultraviolet-light-irradiation dead areas have been eliminated, which is characterized in that the ultraviolet light scanning dead regions where the sterilization is not conducted since ultraviolet light does not reach, are eliminated in such a way that the crystal tubes with the ultraviolet light lamps being inserted therein are poisoned in the interiors of a plurality of cylindrical tubes connected to a header.

The invention claimed is:
1. A microbicidal purification device employing ultraviolet light from which ultraviolet-light-irradiation dead areas have been eliminated, comprising:
headers including a first header and a second header, each header having a header space, the first header having an inlet port and a plurality of tubes, and the second header having an outlet port;
a plurality of cylindrical tubes, both ends of the plurality of cylindrical tubes are open and are coupled in parallel with the respective one of the plurality of tubes of the first header so that both open ends of each cylindrical tube can be connected with the header space of the first header and the header space of the second header, wherein an ultraviolet lamp is inserted into each of the plurality of cylindrical tubes;
a partition plate having a plurality of holes positioned between the header space of the first header and the plurality of tubes such that fluid is discharged through the header space and flows into the interior of each of the plurality of tubes, wherein the header space of the first header is coupled with the plurality of cylindrical tubes in parallel;
a plurality of crystal tubes, each of which has a first end which is closed, and a second end which is sealingly fixed at the first header so that the second end is open and is exposed to the outside of the first header, the plurality of crystal tubes being inserted in the plurality of cylindrical tubes and being positioned at the centers of each of the plurality of cylindrical tubes; and a plurality of ultraviolet light lamps, each of which has a ultraviolet light output forming the diameter of a sterilization region to be larger than or same as the diameter of one of the plurality of cylindrical tubes and inserted and installed in the interior of one of the plurality of crystal tubes, wherein fluid is to be received into the header space of the first header through the inlet port, flows through the plurality of cylindrical tubes in parallel, into the header space of the second header, then out through the outlet port, and wherein each of the header spaces of the first and second headers is a single space.

2. The microbicidal purification device employing ultraviolet light from which ultraviolet-light-irradiation dead areas have been eliminated, according to claim 1, further comprising:

a photocatalyst coating carrier coated with a photocatalyst and is filled in the interior of each of the plurality of tubes, a blocking net having a mesh smaller than the size of the photocatalyst coating carrier being installed at each opening of both ends of the plurality of tubes for the purpose of ensuring that the photocatalyst coating carrier does not escape to the outside, wherein a hole is formed at the center of the blocking net through which each of the plurality of the crystal tubes to be inserted and pass through in parallel with each of the plurality of cylindrical tubes.

3. The microbicidal purification device employing ultraviolet light from which ultraviolet-light-irradiation dead areas have been eliminated, according to claim 1, further comprising:

a cover disposed at the first header where each of the plurality of crystal tubes are fixed, thus covering the second end of each of the tube elements and each of the plurality of ultraviolet light lamps inserted into each of the plurality of crystal tubes.

4. The microbicidal purification device employing ultraviolet light from which ultraviolet-light-irradiation dead areas have been eliminated, according to claim 2, further comprising:

a cover disposed at the first header where each of the crystal tubes are fixed, thus covering the second end of each of the tube elements and each of the plurality of ultraviolet light lamps inserted into each of the plurality of crystal tubes.

\* \* \* \* \*